July 21, 1936.   F. C. FRANK   2,048,443
WHEEL
Filed Feb. 9, 1933
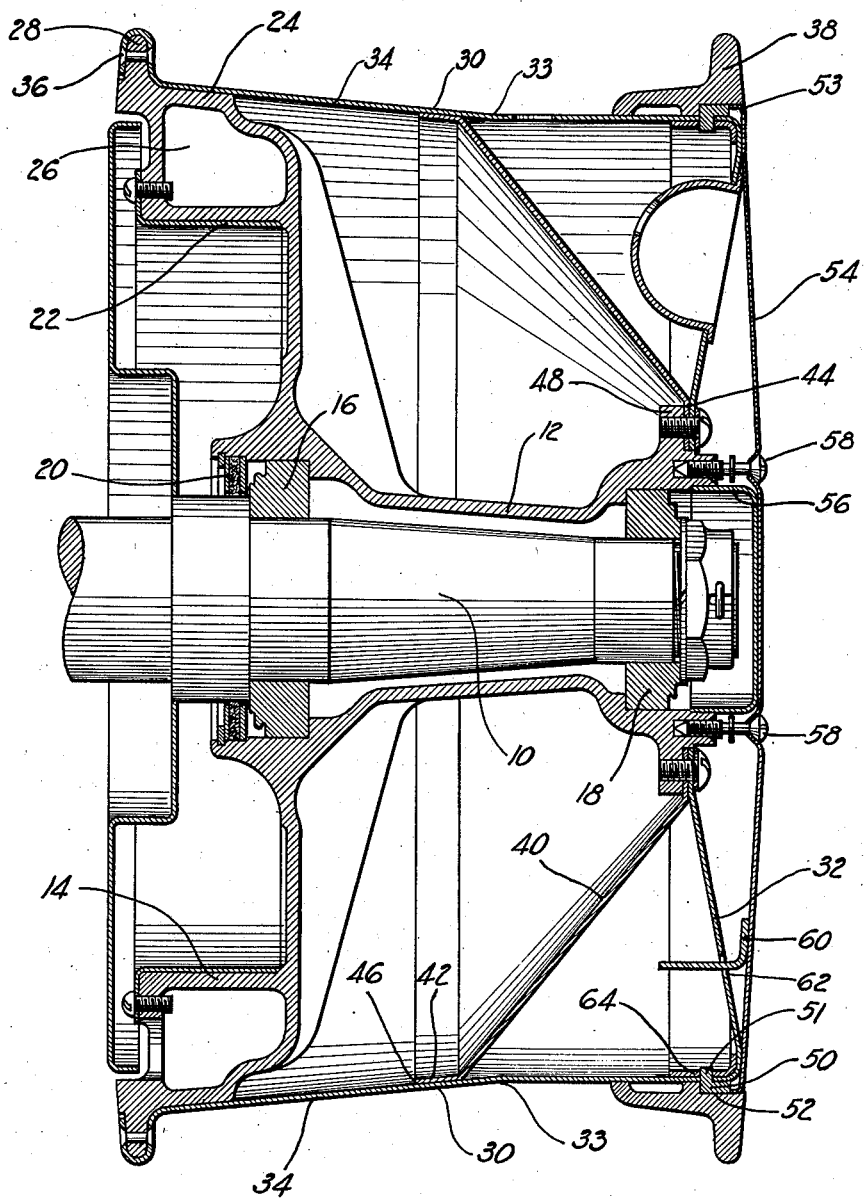
INVENTOR.
FREDERICK C. FRANK
BY J. P. Keiper
ATTORNEY Patented July 21, 1936

2,048,443

UNITED STATES PATENT OFFICE 2,048,443

WHEEL

Frederick C. Frank, South Bend, Ind., assignor to Bendix Aviation Corporation, South Bend, Ind., a corporation of Delaware Application February 9, 1933, Serial No. 656,000

4 Claims. (Cl. 301—6)

This invention relates to wheels and more particularly to wheels adapted for balloon tires, and aviation use.

Wheels for aviation use must necessarily be light and at the same time withstand the severe shocks and side loads incident to landing and rolling across rough ground at high speeds. This invention is therefore directed to a wheel having a light cast metal hub and brake drum, and drawn duralumin cup shaped rim and end disc, the combination of which, with other elements in the novel manner herein disclosed, forms a wheel of exceptional characteristics.

Accordingly an object of the invention is to provide a wheel having a cast hub and drum member and a one piece shell member including rim and end disc.

Another object of the invention is to provide a wheel having a cast hub and drum member, and a one piece shell member including rim and end disc, which is so shaped and fitted on the drum member as to make a tight taper or wedge fit therewith.

A further object of the invention is to provide in a wheel of the class described, a light metal shell cup shaped member comprising a rim and end disc having a conical diagonal brace or support member integrally secured underneath the central portion of the rim portion and extending to the point of hub connection of the end disc.

A still further object of the invention is to provide in a wheel of the class described, a cup shaped shell member adapted to fit snugly upon a hub brake drum member, and be secured thereto by folding the rim of the cup over a flange on the brake drum member.

The above and other novel features of the invention will appear more fully hereinafter from the following detailed description when taken in conjunction with the accompanying drawing. It is expressly understood however, that the drawing is employed for purposes of illustration only and is not designed as a definition of the limits of the invention, reference being had for this purpose to the appended claims.

In the drawing, the single figure illustrates a section of a preferred form of wheel constructed in accordance with the invention.

As shown the wheel comprises a hub and drum casting having a braking drum portion 14 and a hub 12 mounted upon suitable bearings 16 and 18 upon a stub axle or shaft 10, the hub also carrying a grease retaining ring or packing 20. Preferably the braking drum portion comprises a surface adapted to carry a liner 22 if desired, and a rim member 24 spaced from the liner carrying portion by the hollow annular cavity 26. This cavity reduces heat flow from the friction surface to the rubber tire (not shown) which may be mounted upon the rim, and may if desired be filled with a cooling fluid as set forth in a copending application 620,012, filed June 29, 1932.

The remainder of the wheel comprises principally a cup shaped shell, forming a rim member 30 and end disc 32, which parts are drawn from a single part and preferably are made of a light alloy such as duralumin which alloy consists principally of aluminum, a small amount of copper and some iron. The rim is preferably tapered from a point 33 approximately one third of the distance from the end disc 32, the tapered portion being shown as 34, and the rim portion 24 of the brake drum and hub casting is tapered correspondingly and provided with a flange 28, so that the tapered shell portion 34 may be wedged tightly upon the cast member and folded over and around the flange 28 where it may be further secured by rivets 36 which extend through two thicknesses of shell. Such a construction affords an exceptionally smooth tire bead flange, and the taper is such as to make the tire bead support on the brake side of the same height as the tire bead support on the other side, which as shown comprises a removable annular ring member 38. This taper construction is of considerable advantage since it affords a tight wedge connection between the drum and shell and affords a smooth bead flange of correct diameter.

Before assembling the shell member upon the drum and hub member, a conical member 40 having a drum flange 42 and radial flange 44 is preferably integrally secured by the flange 42 to the inside of the rim member as at 46 by welding or other suitable means. In assembly the radial flange 44 is secured together with the end disc 32 to a shoulder 48 on the hub, thereby providing a rigid brace which acts to strengthen the wheel against side shocks and also radial load shocks.

The tire bead support and flange member 38 is slidably mounted upon the cylindrical portion of the rim member and held in place by a removable retaining ring 50, which rests in an annular recess 52, and so that the wheel may present a stream line face, a cover plate 54 is provided having an edge flange 53 adapted to fit in said recess 52 behind the retaining ring. This plate also may hold a hub cap member 56 in place, and in order to secure the plate to the wheel pointed screws 58 are provided together with a lug 60 fitting in an aperture 62 in the side disc 32 which tends to line the screws with the countersunk threaded holes in the hub member.

In order that the lugs 51 on the retaining ring 50 may have a broad bearing surface and also to strengthen the wheel immediately under the tire bead support and flange member 38, an angular annular member 64 is inserted in the corner between the rim and disc portions of the shell members, and may be preferably welded in place.

Though only one embodiment of the invention has been illustrated and described, it is to be understood that the invention is not limited thereto but may be embodied in various mechanical arrangements and forms. As various changes in construction and arrangement may be made without departing from the spirit of the invention, as will be apparent to those skilled in the art, reference will be had to the appended claims for a definition of the limits of the invention.

I claim:

1. A wheel having a hub, a radial end disc and cylindrical rim portion, a removable tire bead supporting and retaining flange member mounted on said rim portion, an annular groove in said flange member, a retaining ring and coverplate extending into and filling said groove, means for securing said coverplate necessitating alignment of holes in said coverplate and wheel, and an alignment lug on said coverplate adapted to engage an aperture in said end disc.

2. A wheel comprising, a hub member having a drum at one end thereof, said drum having a slightly tapered outer face and a flange on the outer edge, a one-piece cup-shaped rim and end disc member providing an end disc, a cylindrical portion adjacent thereto and a tapered portion adjacent the cylindrical portion, said end disc being secured to the other end of said hub, and said tapered portion being wedged on the tapered outer face of said drum and turned over and secured to said flange, a conical brace secured to the said other end of said hub with said end disc, and extending and secured to the rim portion adjacent the junction of the cylindrical and tapered portions, and a removable annular tire bead supporting and retaining flange seated on the cylindrical rim portion.

3. A wheel comprising, a hub member having a drum at one end thereof, said drum having a slightly tapered outer face and a flange on the outer edge, a one-piece cup-shaped rim and end disc member providing an end disc, a cylindrical portion adjacent thereto and a tapered portion adjacent the cylindrical portion, said end disc being secured to the other end of said hub, and said tapered portion being wedged on the tapered outer face of said drum and turned over and secured to said flange, a conical brace secured to the said other end of said hub with said end disc, and extending and secured to the rim portion adjacent the junction the cylindrical and tapered portions, a removable annular tire bead supporting and retaining flange seated on the cylindrical rim portion, and an "L" sectioned annular reinforcing member secured within and to said cylindrical rim portion and end disc and beneath said removable tire retaining flange.

4. A wheel comprising a cast rigid brake drum and rim support part, said rim support part having a slightly tapered outer annular surface and a circumferential flange thereon, a slightly tapered malleable rim member wedged on said tapered outer drum surface and curled around said flange, and means for rigidly securing said rim member to said flange, said rim member, flange and tapered outer surface forming a rigid tire bead support and flange.

FREDERICK C. FRANK.